(12) United States Patent
Southland

(10) Patent No.: US 9,644,373 B2
(45) Date of Patent: May 9, 2017

(54) TOOL FOR FACILITATING THE CUTTING OF SHINGLES

(71) Applicant: Philip John Southland, Scobey, MT (US)

(72) Inventor: Philip John Southland, Scobey, MT (US)

( * ) Notice: Subject to any disclaimer, the term of this patent is extended or adjusted under 35 U.S.C. 154(b) by 131 days.

(21) Appl. No.: 14/858,095

(22) Filed: Sep. 18, 2015

(65) Prior Publication Data

US 2017/0081858 A1    Mar. 23, 2017

(51) Int. Cl.
| | | |
|---|---|---|
| *G01B 5/25* | (2006.01) | |
| *E04D 15/02* | (2006.01) | |
| *B23D 59/00* | (2006.01) | |
| *B43L 7/02* | (2006.01) | |

(52) U.S. Cl.
CPC ............ *E04D 15/02* (2013.01); *B23D 59/00* (2013.01); *B43L 7/02* (2013.01)

(58) Field of Classification Search
CPC ............ B23D 59/00; B43L 7/02; E04D 15/02
USPC .......................... 33/526, 527, 648, 649, 562
See application file for complete search history.

(56) References Cited

U.S. PATENT DOCUMENTS

| 4,183,144 | A * | 1/1980 | Barnett, III | ............. | G01B 3/30 |
| | | | | | 33/649 |
| 5,644,963 | A | 7/1997 | Fountas | | |
| 6,606,930 | B2 | 8/2003 | Fasnacht et al. | | |
| 6,941,664 | B1 | 9/2005 | Engle et al. | | |
| 7,673,394 | B2 | 3/2010 | Ruppe, III | | |
| 7,845,090 | B2 | 12/2010 | Ruppe, III | | |
| 8,479,474 | B2 | 7/2013 | Chestnut, Jr. | | |
| 2002/0184980 | A1 | 12/2002 | Fasnacht et al. | | |
| 2004/0035274 | A1 | 2/2004 | Fasnacht et al. | | |
| 2005/0204652 | A1 | 9/2005 | Schafer | | |
| 2008/0289291 | A1 | 11/2008 | Chestnut, Jr. | | |
| 2009/0145691 | A1 * | 6/2009 | Burgart | ............... | E04G 21/3214 |
| | | | | | 182/45 |
| 2009/0265948 | A1 | 10/2009 | Ruppe, III | | |
| 2009/0265949 | A1 | 10/2009 | Ruppe, III | | |
| 2011/0113723 | A1 * | 5/2011 | Zernec | .................... | E04D 15/02 |
| | | | | | 52/749.11 |
| 2012/0247062 | A1 * | 10/2012 | Elsasser | .................. | E04D 15/02 |
| | | | | | 52/749.12 |
| 2014/0196298 | A1 * | 7/2014 | George | ................. | E04D 15/025 |
| | | | | | 33/648 |
| 2015/0082647 | A1 * | 3/2015 | Marisa | ..................... | G01B 3/14 |
| | | | | | 33/562 |

* cited by examiner

*Primary Examiner* — G. Bradley Bennett
(74) *Attorney, Agent, or Firm* — Antoinette M. Tease

(57) ABSTRACT

A tool for facilitating the cutting of shingles having a base plate and a tubular member. The tubular member comprises a slot on the horizontal surface of the tubular member that extends the entire length of the tubular member and that is offset from the center of the tubular member. The base plate comprises a semicircular cutout with a terminal point that coincides with the center point on the first side edge of the tubular member. The first side of the tubular member is aligned with the longitudinal axis of the base plate so that the tubular member is off-center on the base plate.

5 Claims, 6 Drawing Sheets

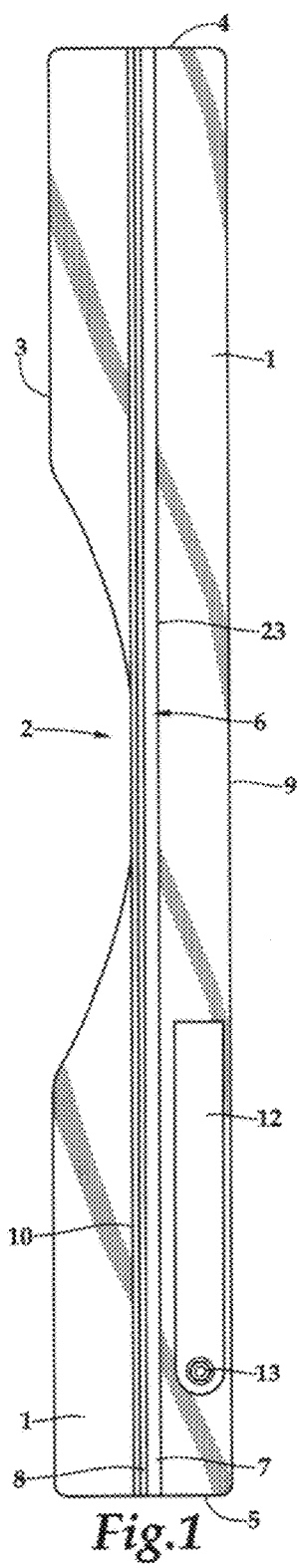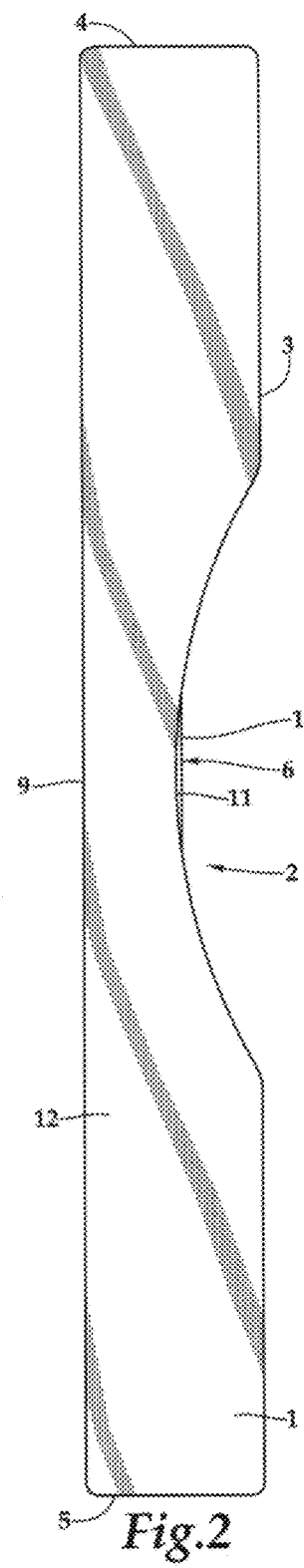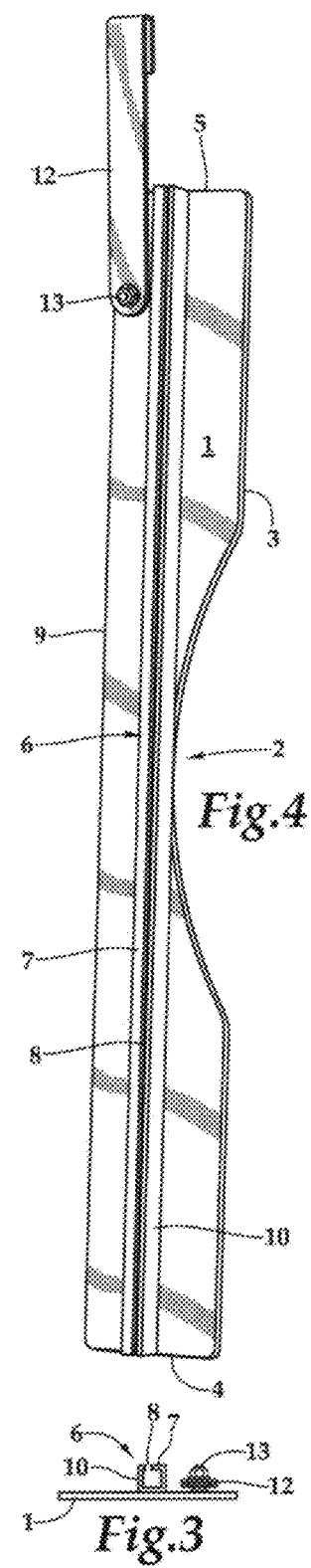

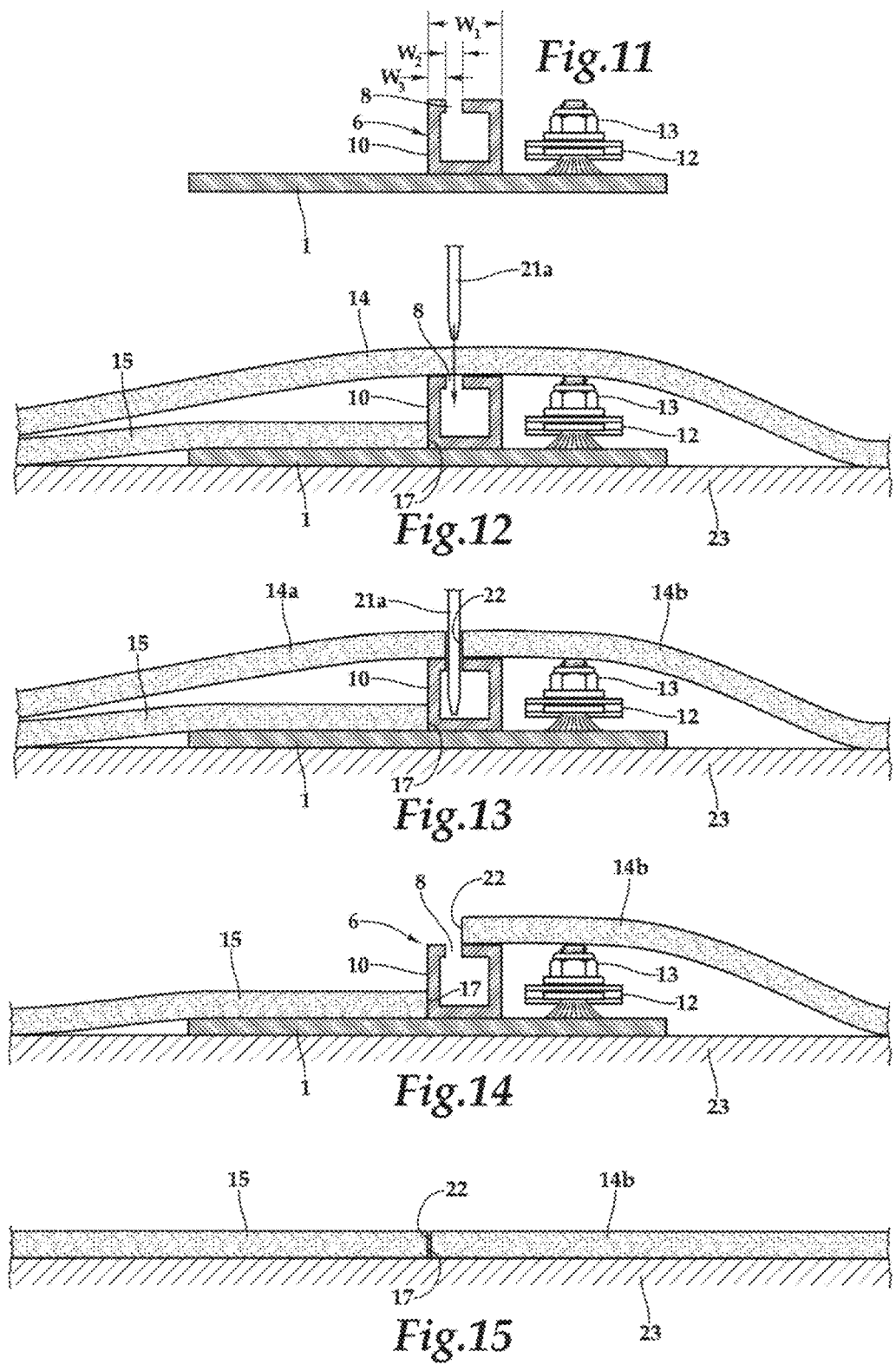

TOOL FOR FACILITATING THE CUTTING OF SHINGLES

BACKGROUND OF THE INVENTION

1. Field of the Invention

The present invention relates generally to the field of hand tools, and more particularly, to a tool that is designed to facilitate the cutting of shingles.

2. Description of the Related Art

Shingling a roof with three-tab or architectural (dimensional) laminated shingles requires many field cuts. Ordinary straight roof may require 100 to 200 field cuts, and complicated roofs with valleys, step-flashed gable ends, and end-of-roof terminations may require over 1000 field cuts. Minimizing the time required to execute a field cut can save a substantial amount of time and cost associated with overall project labor. The present invention not only decreases project time and cost but also reduces safety risks by providing a relatively lightweight, portable, and easy-to-use cutting device. End-of-roof termination cuts can be particularly dangerous to the roofer, ground workers, and to physical property; therefore, any device that can facilitate the implementation of these cuts necessarily reduces safety risks.

There are a number of roofing shingle cutting guides or devices in existence (or patented); however, none of these devices provides the structural and functional advantages of the present invention. For example, U.S. Pat. No. 5,644,963 (Fountas, 1997) describes a roofing shingle cutting device comprised of a rigid base plate with a pivoting cutting guide. The cutting guide may be fixed at perpendicular and non-perpendicular angles to the long axis of the base plate. The invention includes an optional scale mounted along a first side wall of the base plate and an outward extension of the base plate with an opening that serves as a carrying handle.

U.S. Pat. No. 6,606,930 (Fasnacht et al., 2003) provides a saw cutting guide for trimming roofing materials. The cutting guide comprises a mounting plate, a post extending downwardly from the mounting plate, and a base with at least one lateral edge that is substantially parallel with the blade of a power saw. The mounting plate has an aperture (or blade slot) in it to permit the blade of the power saw to pass through the mounting plate.

U.S. Pat. No. 6,941,664 (Engle et al., 2005) discloses a shingle cutting tool with a vertical panel, a horizontal slot for receiving shingles, and a handle. A plurality of cutting members is attached to the vertical panel and extends into a plane of the horizontal slot. A horizontal panel is attached to and extends away from either side of the vertical panel. The horizontal panel is divided into a pair of side panels, each of which is positioned on an opposite side of the vertical panel. Each of the side panels is pivotally coupled to the vertical panel.

U.S. Pat. Nos. 7,673,394 and 7,845,090 (Ruppe, III, 2010) provide a template for cutting wall board to fit fluted deck ceilings. The template comprises a blade with a fluted edge or groove pattern that extends the length of the blade, a T square cross member with a perpendicularly aligning edge, and a pair of slots in the blade that are separate from the fluted edge or groove pattern. The slots are used to attach the cross member to the blade and to allow the cross member to be linearly adjusted along the length of the blade while remaining perpendicular to it.

U.S. Pat. No. 8,479,474 (Chestnut, Jr., 2013) discloses a shingle installation device with a body comprised of an alignment stop and a positioning stop that are parallel to each other. The body also comprises a retainer that forms a gap that is configured to receive and retain the position of the shingle that is being installed. This device is used for positioning, but not for cutting, the shingles.

U.S. Patent Application Pub. No. 2005/0204652 (Schafer) describes a shingle cutting device for use in roof valleys. The device comprises a base body with a handle device mounted on the upper surface of the base body. The lower surface of the base body comprises an inverted, generally C-shaped roof valley-engaging guide channel. A blade support arm is mounted on and extends outwardly from the base body. A blade clamp is mounted no the blade support arm, and a shingle cutting blade is removably mounted in the blade support device.

BRIEF SUMMARY OF THE INVENTION

The present invention is a tool for facilitating the cutting of shingles comprising: a base plate that is rectangular in shape, the base plate having as semicircular cutout that extends inward from a first edge of the base plate and terminates at a center of the base plate, wherein the semicircular cutout is situated an equal distance from a top edge of the base plate and a bottom edge of the base plate, wherein the semicircular cutout comprises a terminal point, and wherein the terminal point of the semicircular cutout coincides with a center point on a first side edge of the tubular member; and a tubular member that is square in shape and that extends longitudinally from the top edge of the base plate to the bottom edge of the base plate, wherein the tabular member has a top surface and a length, wherein the top surface of the tubular member comprises a slot that extends the entire length of the tubular member, wherein the tubular member has a top end and a bottom end, wherein the tubular member is open at the top end and at the bottom end, wherein the slot is offset from a center of the tubular member so that it is closer to the first side edge of the tubular member than to a second side edge of the tubular member, wherein the tubular member comprises a first side, wherein the base plate comprises a longitudinal axis, and wherein the first side of the tubular member is aligned with the longitudinal axis of the base plate so that the tubular member is off-center on the base plate.

In a preferred embodiment, the base plate has a width, the tubular member has a height and a width that are approximately equal, and the width of the tabular member is approximately one-sixth the width of the base plate. Preferably, the corners of the base plate are rounded. The tubular member is preferably welded to the base plate.

In a preferred embodiment, the invention further comprises a hook that is pivotally attached to the base plate, the hook comprises a single piece of metal that is bent at one end, and the hook is attached to the base plate directly adjacent to a second side of the tubular member proximate to a bottom end of the base plate.

BRIEF DESCRIPTION OF THE DRAWINGS

FIG. 1 is a front view of the present invention.

FIG. 2 is a rear view of the present invention.

FIG. 3 is a top view of the present invention.

FIG. 4 is a perspective view of the present invention shown in a hanging position.

FIG. 11 is as section view of the present invention.

FIG. 12 is a section view of the present invention, with a new shingle laid over the top of the guide.

FIG. 13 is a section view of the present invention with a new shingle laid over the to of the guide and a cutting blade in the process of cutting the new shingle.

FIG. 14 is a section view of the present invention after the new shingle has been cut.

FIG. 15 is a section view of the new (cut) shingle lying next to an existing shingle.

REFERENCE NUMBERS

Figure 5:
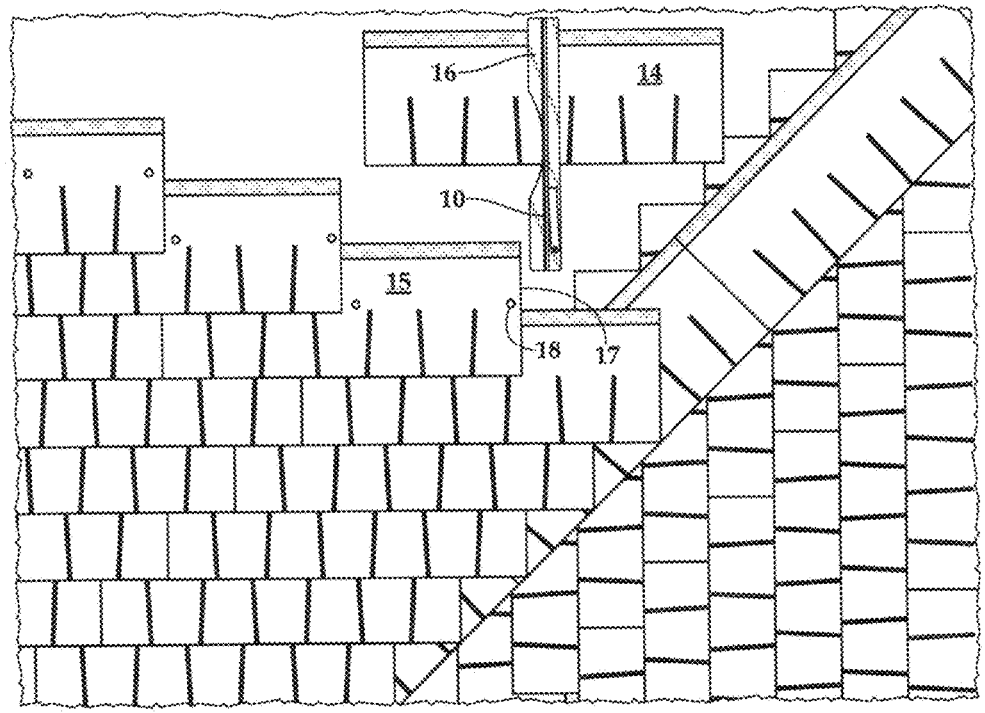
FIG. 5 is a top view of the present invention prior to use on a rooftop.

1 Base plate
2 Semicircular cutout
3 First side edge (of base plate)
4 Top edge (of base plate)
5 Bottom edge (of base plate)
6 Tubular member
7 Top surface (of tubular member)
8 Slot (in tubular member)
9 Second side edge (of base plate)
10 First side (of tubular member)
11 Terminal point (of cutout)
12 Hook
13 Bolt
14 New shingle
14a First half (of cut (new) shingle)
14b Second half (of cut (new) shingle)
15 Existing shingle
16 Tool (present invention)
17 Proximal edge (of existing shingle)
18 Nail
19 Top edge (of new shingle)
20 Top edge (of existing shingle)
21 Cutting tool
21a Cutting blade
22 Newly cut edge (of new shingle)
23 Second side (of tubular member)
24 Rooftop

DETAILED DESCRIPTION OF INVENTION

FIG. 1 is it front view of the present invention. FIG. 2 is a rear view of the present invention, and FIG. 3 is a top view of the present invention. As shown in these figures, the present invention comprises a base plate 1 that is roughly rectangular in shape (preferably with rounded corners) with a semicircular cutout 2 that extends inward from a first side edge 3 of the base plate 1 and terminates at roughly the center of the base plate 1. The semicircular cutout 2 is preferably situated an equal distance from the top edge 4 and the bottom edge 5 of the base plate 1. A tubular member 5 extends longitudinally from the top edge 4 of the base plate 1 to the bottom edge 5 of the base plate 1 and is welded to the base plate 1. In a preferred embodiment, the base plate is approximately three inches wide, and the tubular member 6 (which is preferably square in shape) is approximately 0.5 inch wide and approximately 0.5 inch high.

Figure 16:
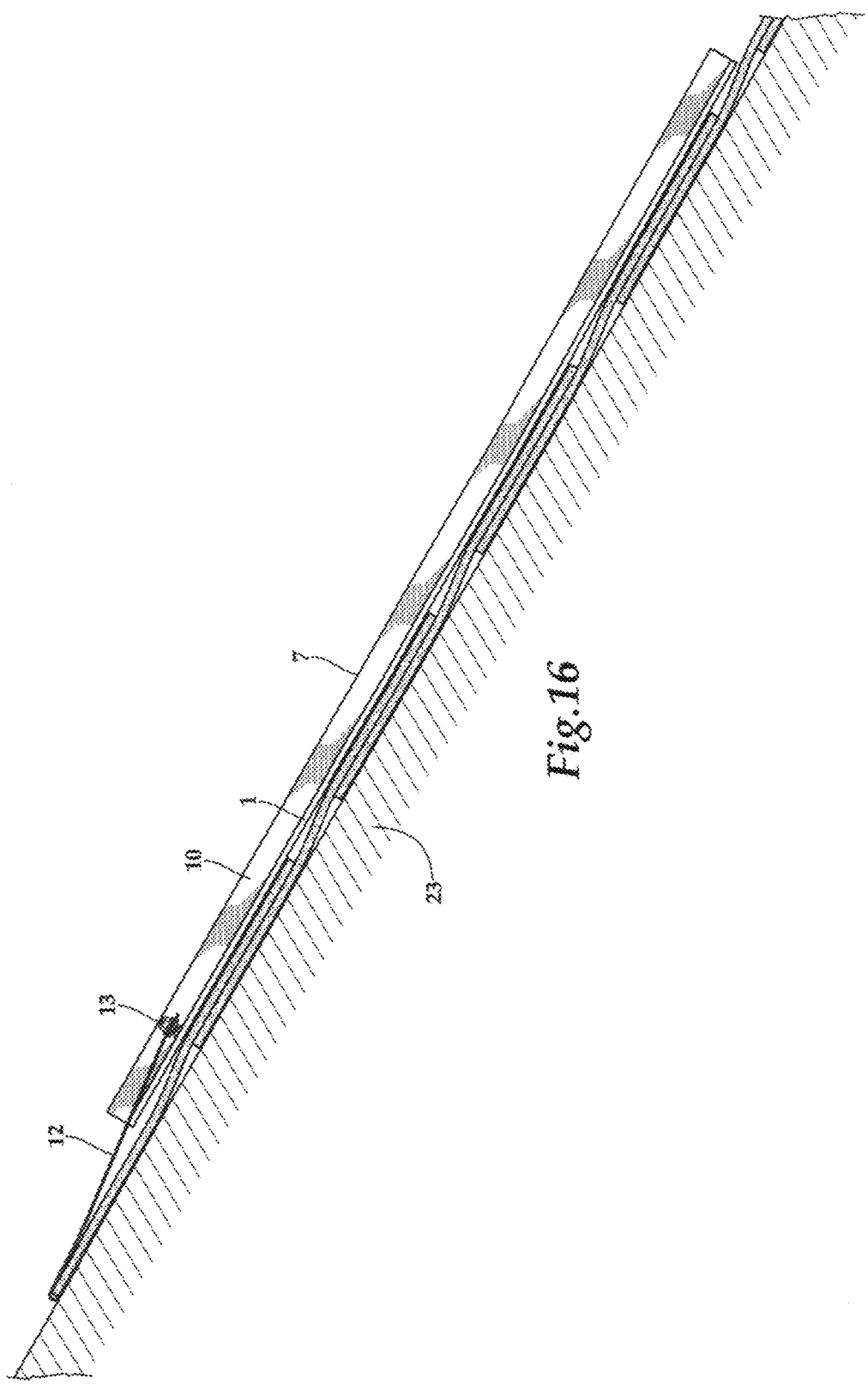
FIG. 16 is a side view of the present invention shown hanging on a shingle on a rooftop.

The top surface 7 of the tubular member 6 comprises a slot 8 that emends the entire length of the tubular member 6. The tubular member 6 is open at the top and bottom ends of the tubular member, and the slot 8 extends all of the way to these two openings. In a preferred embodiment, the slot 8 is not situated in the center of the top surface 7 of the tubular member 6 but is offset from the center so that the slot 8 is closer to the first side edge 3 than it is to the second side edge 9. In a preferred embodiment, the first side 10 of the tubular member 6 is aligned with the longitudinal axis of the base plate 1 so that the tubular member 6 is off-center on the base plate 1; that is, the tubular member 6 extends to the right (from the viewpoint shown in FIG. 1) of the longitudinal axis of the base plate 1. The terminal point 11 of the cutout 2 coincides with the center point on the first side edge 10 of the tubular member 6 (see FIG. 2), In a preferred embodiment, the invention further comprises it hook 12 that is pivotally attached to the base plate 1 via a bolt 13. The hook 12 enables the tool to be hung on a shingle, as shown in FIG. 16. The hook 12 preferably comprises a single piece of metal that is bent at one end to form a hook. The hook 12 is preferably attached to the base plate 1 directly adjacent to the second side 23 of the tubular member 6 proximate to the bottom end 5 of the base plate 1.

FIG. 5 is a top view of the present invention prior to use on a rooftop. At this stage, several shingles (shown with nails in them) have already been secured to the rooftop. The new shingle 14 is about to be installed. The present invention will be used to position the new shingle 14 directly adjacent to the existing shingle 15 and to cut the new shingle 14 so that it can be stapled to the roof without further positioning.

Figure 6:
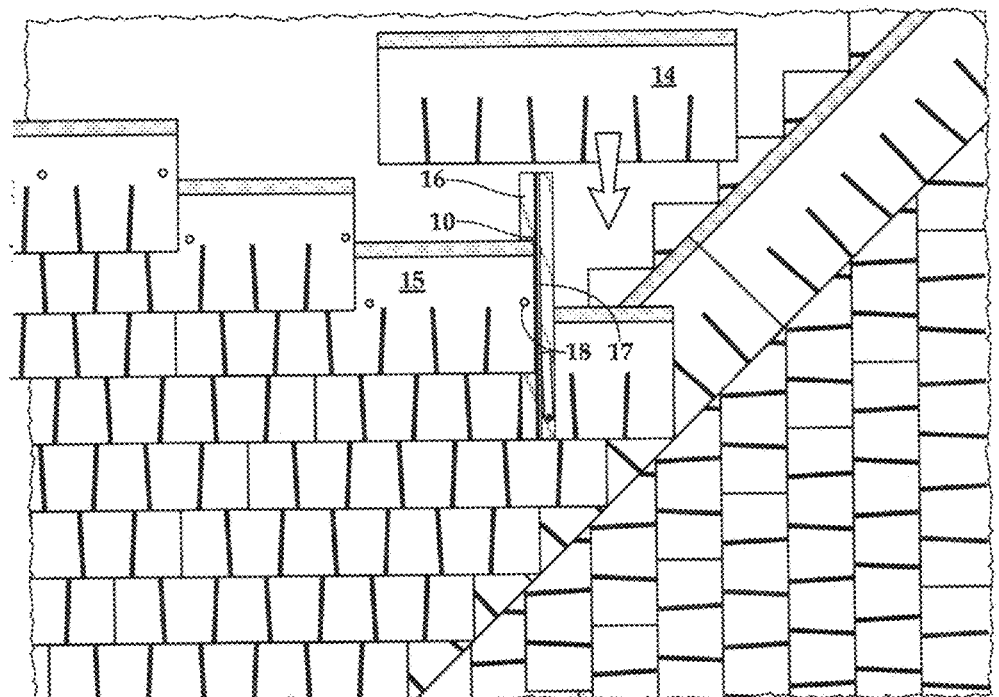
FIG. 6 is a top view of the present invention at the first step in the process of installing a shingle, where the guide is placed up against an existing shingle.

FIG. 6 is a top view of the present invention at the first step in the process of installing a shingle, where the guide is placed up against an existing shingle. In this step, the tool 16 has been positioned so that the proximal edge 17 of the existing shingle 15 abuts up against the first side edge 10 of the tubular member 6. Note that the nail 18 that is securing the existing shingle 15 to the rooftop lies within the semicircular cutout 2 in the base plate 1.

Figure 7:
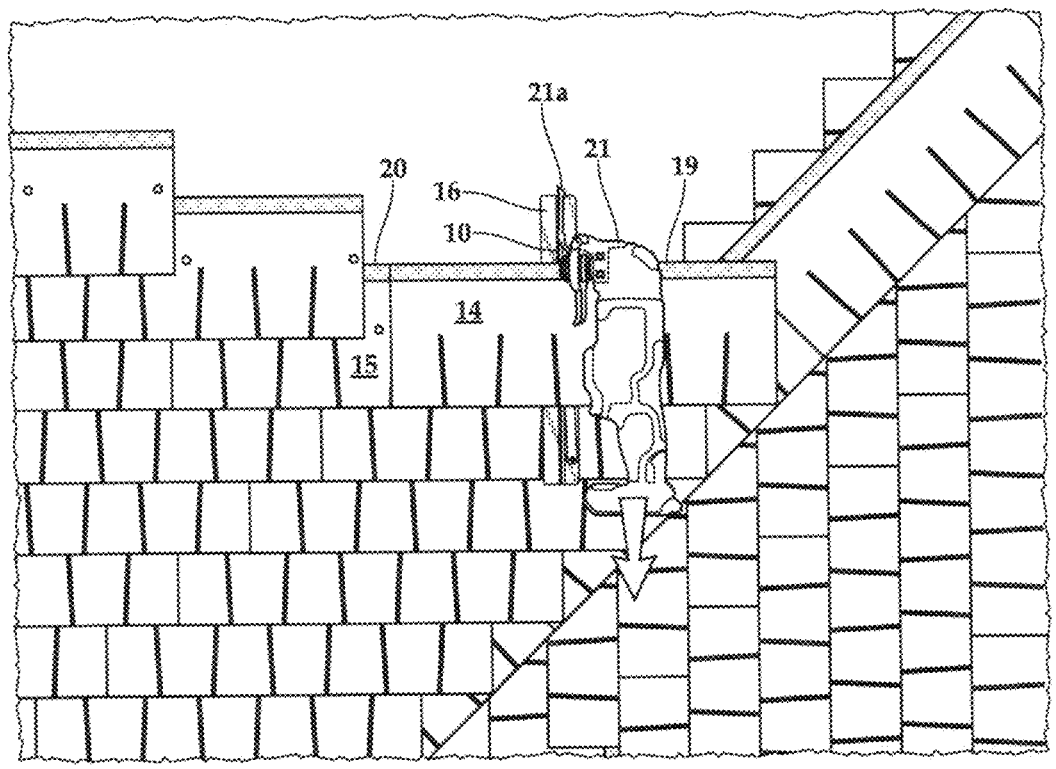
FIG. 7 is a top view of the present invention at the second step in the process of installing a shingle, where a new shingle is placed over the guide.

FIG. 7 is a top view of the present invention at the second step in the process of installing a shingle, where a new shingle is placed over the guide. At this step, the new shingle 14 is placed over the tool 16 so that the top edge 19 of the new shingle 14 is aligned with the to edge 20 of the existing shingle 15. A cutting tool 21 (preferably an oscillating multi-cutter) is used to cut the new shingle 14. The blade (not shown) of the cutting tool 21 is inserted into the longitudinal slot 8 in the tubular member 6 at the top end of the tubular member, and the blade is then moved from the top and of the tubular member 6 to the bottom end of the tubular member 6, thereby cutting the new shingle 14 front top to bottom. The positioning of the tubular member 6 on the base plate 1 and the location of the longitudinal slot 8 within the tubular member 6, as described above, ensure that the newly cut edge of the existing shingle 14 will abut op against the proximal edge 17 of the existing shingle 14 without any gaps.

Figure 8:
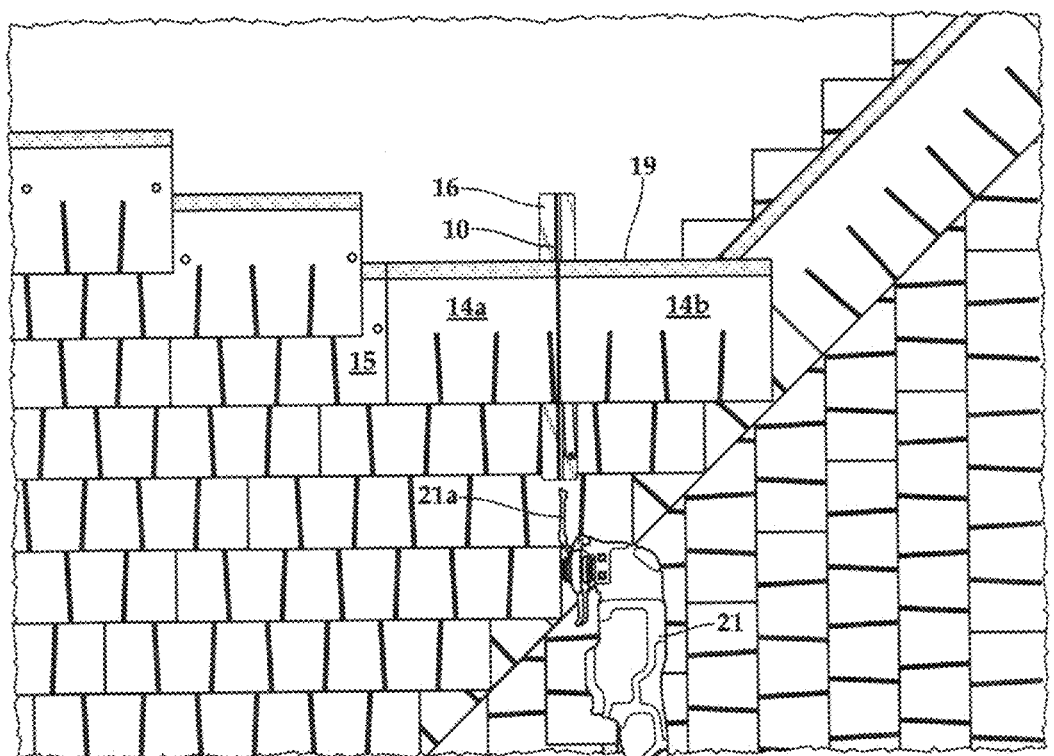
FIG. 8 is a top view of the present invention at the third step in the process of installing a shingle, where the new shingle is cut.

FIG. 8 is a top view of the present invention at the third step in the process of installing a shingle, where the now shingle is cut. At this step, the cutting tool 21 has completed cutting the new shingle 14, which now exists in two halves.

Figure 9:
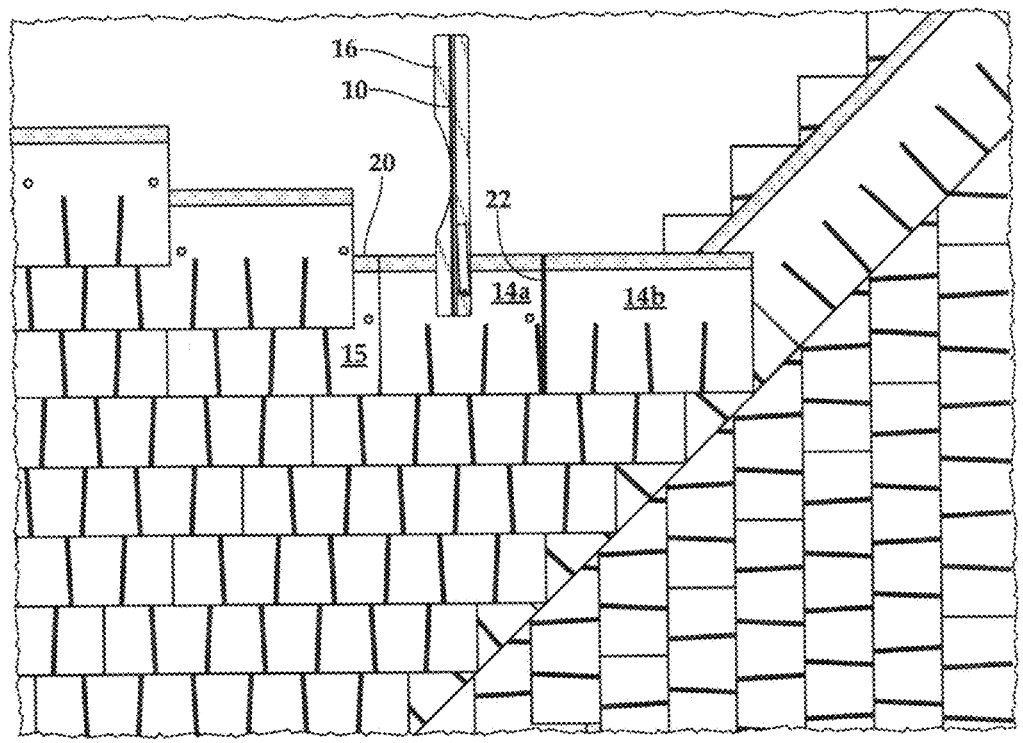
FIG. 9 is a top view of the present invention at the fourth step in the process of installing a single, where the guide is removed from underneath the new shingle.

FIG. 9 is a top view of the present invention at the fourth step in the process of installing a single, where the guide is removed from underneath the new shingle. At this step, the cutting tool 21 has been sot aside, and the tool 16 is removed from underneath the cut (new) shingle 14. The left-hand side (or first half) 14a of the cut (new) shingle will be discarded.

Figure 10:
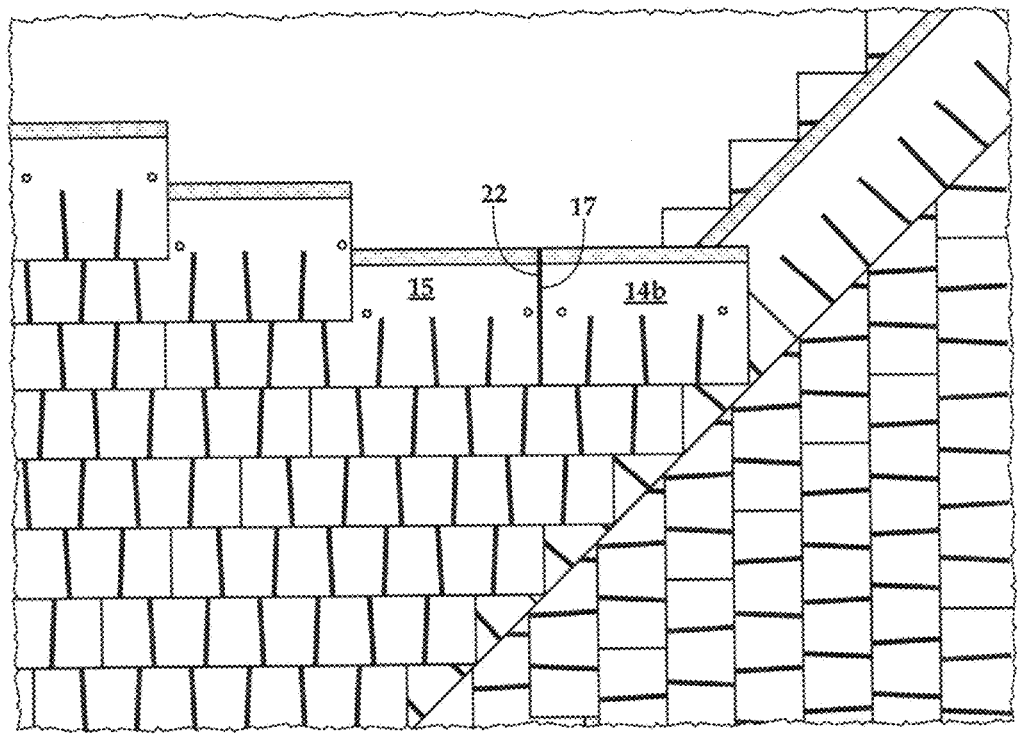
FIG. 10 is a top view of the present invention at the fifth step in the process of installing a new shingle, where the new shingle is stapled to the roof.

FIG. 10 is a top view of the present invention at the filth step in the process of installing a new shingle, where the new shingle is stapled to the roof. At this step, the left-hand side 14a (or first half) of the cut (new) shingle has been discarded, and the right-hand side 14b (or second half) of the cut (new shingle) is stapled to the roof. As a result of the use of the present invention, the newly cut (left-hand) edge 22 of the new shingle 14 is perfectly aligned with the proximal edge 17 of the existing shingle 15.

FIG. 11 is a section view of the present invention. As noted above, in a preferred embodiment, the width of the tubular member 6 is approximately 0.5 inch. This figure shows that the longitudinal slot 8 in the tubular member 6 is slightly offset, as described above, and that the first side 10 of the tubular member 6 is aliened with the longitudinal axis of the base plate 1, also as noted above. These dimensions ensure that the newly cut edge 22 of the new shingle 14 will abut up against the proximal edge 7 of the existing shingle 15 (as shown in FIG. 15). As shown in this figure, in a preferred embodiment. $W_2$ is approximately equal to $W_3$, and $W_2$ and $W_3$ together are approximately equal to one-half of $W_1$.

FIG. 12 is a section view of the present invention with a new shingle laid over the top of the guide. In this figure, the cutting blade 21a of the cutting tool 21 is positioned over the existing shingle 14.

FIG. 13 is a section view of the present invention with a new shingle laid over the top of the guide and a cutting blade in the process of cutting the new shingle. In this figure, the cutting blade 21a of the cutting tool 21 is in the process of cutting the existing shingle 14. Note that the cutting blade 21a extends into the tubular member 6 through the slot 8 in the top surface 7 of the tubular member 6.

FIG. 14 is a section view of the present invention after the new shingle has been cut. In this figure, the existing shingle 14 has been cut, and the first half 14a (not shown) of the existing shingle 14 has been removed.

FIG. 15 is a section view of the new (cut) shingle lying next to an existing shingle. In this figure the tool 16 has been removed from underneath the existing shingle 15 and the new shingle 14, and the two shingles are lying flat against the rooftop 24. Note that the proximal edge 17 of the existing shingle 15 abuts up against the newly cut edge 22 of the new shingle 14b to form a perfect fit between the shingles.

In a preferred embodiment, the width of the tool 16 is three inches, and the length of the tool is two feet. The base plate is preferably comprised of a ⅛-inch thick steel base upon which to stoned piece of ½-inch square tubing is attached. The base plate 1 of the present invention prevents any damage from occurring to the existing (previously installed) shingle 15 or the underlayment (rooftop) during the cutting process.

Presently, shingles that terminate at a wall or a valley are cut by hand with a knife and square, with tin snips, with power sheers, or whether a shingle sheer table. Hand cutting requires the roofer to first measure the shingle and then transfer the measurement to the back of the shingle. Once the shingle is marked, a framing square is used as at guide, and a utility knife is used to score or cut through the shingle from the back side. Once the shingle is cut, it is then nailed into place. This method is the slowest of all of the aforementioned alternatives, but tool costs are minimal. Typically, the roofer holds the framing square with one hand while scoring with the other hand; this process brings a very sharp knife close to the hand that is holding down the framing square. Cut injuries to the hand are common when this method is used.

Cutting with tin snips is safer than hand cutting with a knife and square, but it is also quite slow. The shingle must be measured, square, cut and installed. Shingles are abrasive, and the snips wear out quickly. Power sheers cut more quickly, but measuring and squaring is still required. The sheer blades also wear out relatively quickly and are expensive to replace.

Due to the cost of shingle sheer tables, they are usually used only by the larger scale roofers. This type of sheer has its drawbacks, however. First, the sheer tables are large and bulky and take up a lot of room in construction vehicles; they are also a menace to carry up a ladder or move about on a roof. Second, there is/are typically only one or two sheer tables on a roofing job, which means that if several men are working on the same job, the sheer must be centrally positioned and shared. In this setting, time is wasted moving from the work area to the sheer to cut the shingle and back to the work are to install the shingle. Third, most sheer require periodic blade replacement, which is costly.

The present invention solves all of these problems by providing a tool that eliminates the measurement and squaring steps, is inexpensive and portable, and that does not require blade replacement. In addition, the present solves the problem of shingles falling to the ground because it eliminates the need for cutting shingles with a hook blade the roof edge. When terminating a row of shingles at the end of the roof, most roofers run the shingle over the edge of the roof and then use the roof edge as a guide for cutting the shingle with at hook blade. Some roofers then let the cut portions of the shingles fall to the ground, which can cause damage to siding, flower beds, window frames, shutters, or anything else along the side of the structure. To keep cutoffs from falling the roofer must cut with one hand while reaching out over the roof edge to hold the cut portion of the shingle with the other hand. This method obviously creates a falling risk to the roofer.

When the tool is not in use, it can be hung on a shingle using the fold-out hanger (hook); this feature prevents the tool from falling off of the roof. FIG. 16 shows the present invention hooked onto a shingle on a rooftop.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A tool for facilitating the cutting of shingles comprising:
   (a) base plate that is rectangular in shape, the base plate having a semicircular cutout that extends inward from a first edge of the base plate and terminates at a center of the base plate, wherein the semicircular cutout is situated an equal distance from a top edge of the base plate and a bottom edge of the base plate, wherein the semicircular cutout comprises a terminal point, and wherein the terminal point of the semicircular cutout coincides with a center point on a first side edge of a tubular member; and (b) wherein the tubular member is square in shape and that extends longitudinally from the top edge of the base plate to the bottom edge of the base plate, wherein the tubular member has a top surface and a length, wherein the top surface of the tubular member comprises a slot that extends the entire length of the tubular member, wherein the tubular member has is top end and a bottom end, wherein the tubular member is open at the top end and at the bottom end, wherein the slot is offset from a center of the tubular member so that it is closer to the first side edge of the tubular member than to a second side edge of the tubular member, wherein the tubular member comprises a first side, wherein the base plate comprises a longitudinal axis, and wherein the first side of the tubular member is aligned with the longitudinal axis of the base plate so that the tubular member is off-center on the base plate.

2. The tool of claim 1, wherein the base plate has a width, wherein the tubular member has a height and is width that are approximately equal, and wherein the width of the tubular member is approximately one-sixth the width of the base plate.

3. The tool of claim 1, wherein the corners of the base plate are rounded.

4. The tool of claim 1, wherein the tubular member is welded to the base plate.

5. The tool of claim 1, further comprising a hook that is pivotally attached to the base plate, wherein the hook comprises a single piece of metal that is bent at one end, and wherein the hook is attached to the base plate directly adjacent to a second side of the tubular member proximate to a bottom end of the base plate.

* * * * *